United States Patent
Young

[15] 3,691,099
[45] Sept. 12, 1972

[54] TREATMENT OF ALUMINOSILICATE

[72] Inventor: Dean Arthur Young, 4721 Palm Ave., Yorba Linda, Calif. 92686

[22] Filed: Feb. 27, 1970

[21] Appl. No.: 15,219

Related U.S. Application Data

[63] Continuation-in-part of Ser. No. 797,678, Feb. 7, 1969, abandoned, which is a continuation-in-part of Ser. No. 697,587, Jan. 15, 1968, Pat. No. 3,460,934, which is a continuation-in-part of Ser. No. 457,485, May 20, 1965, Pat. No. 3,383,169.

[52] U.S. Cl. ................. 252/450, 252/455 Z, 23/112
[51] Int. Cl. ........................... B01j 11/32, B01j 11/40
[58] Field of Search ..252/450, 455 R, 455 Z; 23/112

[56] References Cited

UNITED STATES PATENTS

| | | |
|---|---|---|
| 2,253,285 | 8/1941 | Connolly ............... 252/455 X |
| 2,971,904 | 2/1961 | Gladrow et al. ........ 252/455 X |
| 3,201,197 | 8/1965 | Showalter .............. 252/450 X |
| 3,213,038 | 10/1965 | Chomitz .................... 252/450 |
| 3,375,064 | 3/1968 | Miale et al. ............. 252/455 X |
| 3,406,124 | 10/1968 | Eastwood et al. ......... 252/455 |

*Primary Examiner*—C. F. Dees
*Attorney*—Milton W. Lee, Richard C. Hartman, Lannas S. Henderson, Dean Sanford, Robert E. Strauss and Michael H. Laird

[57] ABSTRACT

The properties of aluminum-containing refractory oxides in which at least some of the aluminum atoms are tetra-coordinated are improved and/or retained upon contacting with aqueous acidic media in the presence of slats having cations capable of satisfying the negative charge on the tetra-coordinated aluminum atoms. Further advantage with regard to zeolites is realized when the salt anion is capable of combining, e.g., reacting, complexing etc., with aluminum.

25 Claims, No Drawings

TREATMENT OF ALUMINOSILICATE

This application is a continuation-in-part of my copending application, Ser. No. 797,678, filed Feb. 7, 1969, now abandoned, which was a continuation-in-part of Ser. No. 697,587, filed Jan. 15, 1968, now U.S. Pat. No. 3,460,934, itself a continuation-in-part of my application, Ser. No. 457,485, filed May 20, 1965, now U.S. Pat. No. 3,383,169.

BACKGROUND

Considerable effort has been devoted to the improvement of natural and synthetic aluminum-containing oxides such as clays, gels, aluminosilicates and the like with regard to pore structure, crystalline form, catalytic and adsorptive activity and thermal, hydrothermal and acid stability. Substantial incentive for this endeavor results from the broad application that such compositions have found as adsorbents, catalysts and ion exchange media in numerous chemical and hydrocarbon conversion and process systems. It is often the case that the chemical, physical and catalytic properties of these materials deteriorate on exposure to process environments, particularly those involving elevated temperatures and/or acidic process media. For example, the crystallinity and catalytic activity of aluminosilicate hydrocracking catalysts are known to deteriorate on exposure to repeated regeneration which often involves exposing the catalyst to an extreme temperature capable of burning off deposited coke and residual hydrocarbon. The regeneration of such cracking catalysts generally requires that the catalyst be able to withstand steam and/or thermal atmospheres at temperatures in a range of 1,300°–1,700° F. These compositions must also be able to withstand the chemically degrading influence of acidic materials such as the sulfur and nitrogen oxides encountered during regeneration of some systems.

The crystalline aluminosilicate zeolites represent a class of refractory oxides in which there is currently considerable interest in these and other respects. One factor that is known to influence the tolerance of crystalline aluminosilicates to acidic and thermal environments is the structural silica to alumina ratio. For any given class of aluminosilicates, catalytic activity, thermal stability and resistance to acid attack are known to improve as the structural $SiO_2/Al_2O_3$ ratio is increased. The value of procedures that are effective in increasing this ratio is therefore readily apparent.

One approach to the problem described by P. K. Maher and C. V. McDaniel in U.S. Pat. No. 3,293,192 involves the repeated successive calcination of ammonium or hydrogen zeolite Y at temperatures between 1,000° and 1,500° F. and intermediate back exchange with ammonium salts. Another procedure disclosed by L. J. Reid in U.S. Pat. No. 3,367,884 involves contacting zeolite Y, prestabilized by high temperature calcination, with strongly acidic solutions to which the unstabilized zeolite cannot be subjected without destruction of the crystalline structure. It is also observed by Reid that the described procedures are not applicable to Y zeolite which has not been "activated" prior to treatment. Yet another procedure for increasing the $SiO_2Al_2O_3$ ratio of stabilized zeolites disclosed in Netherlands Patent application No. 6,704,534 involves the prestabilization of ammonium zeolite Y by high temperature steaming followed by prolonged contact with the ammonium salt of ethylenediaminetetraacetic acid. It has also been observed that certain improvements in the characteristics of hydrogen zeolite Y can be achieved by steaming at temperatures of from 700°–800° C. as discussed by G. T. Kerr in the Journal of Physical Chemistry, 71, 4155 (1967) whereas stabilization of hydrogen and ammonium Y zeolites by calcination at 500° C. in the presence of ammonia has been investigated by G. T. Kerr and G. F. Shipman, Journal of Physical Chemistry, 72, 3071 (1968) and C. J. Plank, U.S. Pat. No. 3,404,086.

All of these procedures involve the treatment of stabilized zeolites in either the hydrogen form or in the ammonium form that readily converts to the hydrogen form upon calcination.

There also exist highly stable, highly silicious naturally occurring aluminosilicates such as mordenite discussed by R. M. Barrer, Canadian Journal of Chemistry, 42, 1481 (1964), which can be exposed to highly acid aqueous hydrochloric acid at a pH of less than 1 without destroying the dense mordenite crystal structure. However, it is well established that the more catalytically active zeolites, particularly the faujasite-type zeolites, do not retain their ordered internal structure on exposure to acidic environments without recourse to cumbersome precalcination, e.g., prestabilization procedures. For example the crystalline structure of sodium zeolite Y is completely destroyed on exposure to strong aqueous acids when the pH of the slurried mixture is below about 3.2. Other of the faujasite type zeolites are even less stable, the degree of stability generally being correlated with silica to alumina ratio. For example zeolite X, a relatively low silica faujasite having a silica ratio less than 3, decomposes on contacting in aqueous acid at pH of less than about 4. On the other hand, zeolite Y with a $SiO_2/Al_2O_3$ ratio of 5.0 is relatively stable in aqueous acid at pH of down to about 3. The ability to improve these qualities of aluminosilicates, particularly the faujasite-type zeolites, by a simplified procedure not necessitating involved sequences of ion exchange, high temperature treatment, and back exchange would obviously be of considerable value.

However as previously mentioned, the procedures herein discussed relate not only to the improvement of aluminosilicate zeolites but can also be applied with advantage to the treatment of other refractory oxides containing aluminum in which at least a portion of the aluminum atoms are tetra-coordinated and associated with relatively mobile cations or are capable of forming cation exchange sites. Exemplary of such materials are the amorphous aluminosilicates and other refractory oxide cogels of alumina, silica and the metal oxides of Groups IID, III and IV of the Periodic Chart such as silica zirconia, silica magnesia, alumina thoria, etc., and the siliceous clays, such as the micaceous clays, exemplified by kaolin, montmorillonite, bentonite, illite, and the like. These materials have utility not only as catalysts and catalysts supports but also find application as selective adsorbents, drying agents and the like. The properties of these materials render them useful such a variety of applications derived not only from physical structure and silica to alumina ratios such as that associated with crystalline aluminosilicate zeolites but are also attributable to the acidity associated with the tetraacoordinated aluminum cation exchange sites and surface area. The acidic character of refractory oxide catalyst and catalyst supports is known to be responsible at least in part for the activity of such catalysts in the conversion of organic compounds and to some extent with regard to their effectiveness as selective adsorbents. The surface area of these materials is a consideration of substantial importance whether they are to be employed simply as physical contacting media or as catalytic promoters. It is therefore apparent that procedures which prevent the degradation of these desirable properties upon exposure to deprecating environments or which so modifies the characteristics of the refractory oxides so as to increase its tolerance to such degradation would be of considerable value. For example, the exposure of alumina-containing clays, aluminosilicates or cogels such as those previously mentioned to strongly acidic environments may produce undesirable changes in both physical structure and chemical composition by promoting loss of surface area, collapse of crystal structure or deactivation of acidic cation exchange sites. Nevertheless, such environments are encountered or might be beneficial in the treatment of these refractory oxides. Exemplary of such procedures are the acid extraction of clays to remove undesirable mineral deposits, the acid extraction of various forms of aluminum-containing refractory oxides to remove acid soluble constituents, the impregnation of refractory oxide supports with materials requiring the use of strongly acidic media, such as the catalyst preparation method disclosed in the copending application, Ser. No. 837,340, by Grant A. Mickelson incorporated herein by reference, and the impregnation of refractory oxides, particularly zeolitic aluminosilicates, with acidic solutions of chromic and/or ferric salts or heteropoly complexes of Group IV elements. The acid extraction and treatment of clays is known to be a useful expedient toward removing impurities and increasing activity as discussed in U.S. Pat. Nos. 3,446,727, 2,935,463 and 2,410,436. Acid extraction in the presence of salt can also be used to improve the activity, selectivity and physical stability of aluminosilicate zeolites. Improvement of these properties attributable at least in part to variations in $SiO_2/Al_2O_3$ ratio is well known in the art particularly with regard to zeolites X and Y and mordenite. The exposure of refractory and pressures up to media 2,000 also psig. found useful in the preparation of catalytic combinations, exemplified by the conditions involved in the formation of silica gels upon the polymerization of silicic acid and the formation of cogels such as silica-alumina, silica-zirconia, and the like. In certain applications it would be of considerable advantage to be able to form such gels and cogels requiring the use of strong acidic media in the presence of acid sensitive materials such as unstabilized aluminosilicate zeolites without running the risk of destroying the desirable properties of the zeolite.

It is therefore one object of this invention to provide an improved method for increasing the thermal, hydrothermal, and acid stability of aluminosilicates. It is another object of this invention to provide a method of increasing the silica to alumina ratio of aluminosilicates. It is yet another object of this invention to provide a method for increasing the structural silica to alumina ratio of faujasite type zeolites. It is another object of this invention to provide a method for abstracting aluminum from aluminosilicates, particularly faujasite-type zeolites, while avoiding the destruction of the ordered internal structure thereof. It is yet another object of this invention to provide a method for stabilizing aluminosilicates, particularly faujasite-type zeolites, in acidic media. Yet another object of this invention is the provision of a method for minimizing or preventing the loss of adsorptive capacity and acid forming character of refractory oxide compositions containing tetra-coordinated aluminum. Another object of this invention is the provision of a method for contacting acid sensitive materials with strongly acidic media while reducing the deprecating effect of the acidic media on desirable properties of the refractory oxides.

In accordance with one embodiment of this invention the tolerance of certain refractory oxides containing tetra-coordinated aluminum atoms to strongly acidic media is substantially increased in the presence of salts soluble in the aqueous media and having a cation capable of readily balancing the negative charge on the $AlO_4$ tetrahedra. Further advantage is realized by providing that at least a portion of the salt added to the acidic media have an anion capable of combining, e.g., reacting, complexing, coordinating, etc., with aluminum. I have observed that the presence of the described salts substantially reduces the degree of diminution of desirable characteristics such as surface area, physical integrity, and acid forming ability in addition to promoting the results desired by acid treatment in some situations such as by accentuating the abstraction of aluminum.

In accordance with another embodiment of this invention I have discovered that structural aluminum can be abstracted from aluminosilicates thereby increasing the structural $SiO_2/Al_2O_3$ ratio while maintaining the ordered internal crystalline structure of the aluminosilicate in mildly acidic solutions within the acid tolerance of the aluminosilicate. I have also discovered that the tolerance of aluminosilicates to aqueous acidic media is substantially increased in the presence of salts soluble in the aqueous acid medium and having an anion capable of combining, e.g., reacting, complexing, coordinating, etc., with aluminum and/or a cation capable of readily balancing the negative charge on the $AlO_4$ tetrahedra. This aqueous treatment is far more convenient and easier to effectuate than previously employed high temperature steaming, calcination and multiple exchange procedures. The method steps involved can be readily accomplished in conventional ion exchange equipment and can even be combined with an ion exchange step wherein it is desired to change the cationic form of the aluminosilicate.

In accordance with another embodiment of this invention, crystalline aluminosilicates having silica to alumina ratios of at least 2 and having ammonium, Group IA, IB, IIA, IIB, IIIB, VIIB and/or VIII metal cations are contacted with aqueous acid at a pH between 2 and 6 and at a temperature and for a period of time correlated with the acid stability of said crystalline aluminosilicate sufficient to abstract structural aluminum from said aluminosilicate yet insufficient to destroy the crystallinity of said aluminosilicate.

The ability of aluminosilicates to maintain their structural integrity in the presence of acidic medium is at least in part a function of the $SiO_2/Al_2O_3$ ratio. For example, zeolite X having a silica to alumino ratio of less than 3 loses all its crystallinity when contacted with strong acids at pH below about 4 whereas zeolite Y having a silica to alumina ratio of 5.0 can be subjected to acid medium at the pH of down to about 3. On the other hand, zeolites having substantially higher $SiO_2/Al_2O_3$ ratios, such as zeolites L and T, erionite and micaceous clays are much more stable and do not decompose if the solution pH is maintained at about 1 or higher. The degree to which the aluminosilicate maintains its crystallinity also depends on the severity of the conditions other than pH at which it is contacted with the acidic medium. For example, the rate of aluminum abstraction is greater at elevated temperatures than at lower temperatures with the result that a given aluminosilicate might retain a substantial degree of its original crystallinity on exposure to 3.0 pH HCl at 70° F. yet be completely destroyed on exposure to the same acidic medium at 212° F. Similarly, the duration for which the aluminosilicate is subjected to acid treatment influences the extent to which the $SiO_2Al_2O_3$ ratio is increased, with the result that extended contact times might completely destroy the crystallinity of a given aluminosilicate at a given pH and temperature whereas a substantial degree of the ordered internal structure might be maintained at contact times of lesser duration. As the selection of these parameters depends upon stability of the original aluminosilicate it is apparent that the optimum conditions of pH, temperature and contact time must necessarily be determined in each particular case in order to accomplish the most desirable results. This evaluation can be readily accomplished by exposing several portions of the desired aluminosilicate to aqueous media of different pH. For example, the zeolite may be contacted with aqueous HCl solutions at pH solutions 3.4, 3.0 and 2.6, at several different temperatures, for example 70°, 160° and 212° F., for different contact times such as 1, 4 and 12 hours followed by purification by water washing and X-ray analysis to determine the extent of crystal loss. However, as a general rule crystalline aluminosilicates having $SiO_2/Al_2O_3$ ratios of at least about 2, and preferably from 2 to about 6, are effectively treated by the methods of this invention at a pH within the range of from about 2 to about 5, temperatures of from about 70° to about 200° F. and contact times of from about 1 to about 12 hours.

Although more substantial increases in relative silica content can be realized by utilizing the lower pH solutions, higher temperatures and more extensive contact times, it should be observed that these same factors also result in a greater degree of crystallinity destruction. Therefore, the operating conditions employed in any specific instance must be determined in view of the resistance of the crystal structure to collapse on contact with acid and the extent of aluminum removal desired.

Many of these same considerations must be taken into account when dealing with the noncrystalline aluminum containing refractory oxides previously discussed. Although these materials are not generally as sensitive to acid attack as are the crystalline aluminosilicates, their desirable properties can nevertheless be substantially reduced or completely destroyed if the conditions of contacting, i.e., pH, temperature and time, are too severe.

Essentially any acid capable of reacting with the aluminum in the aluminosilicate can be employed for these purposes. However, a particular preferred class of acids those in which the anion is capable of combining in a relatively stable form with aluminum by either chemical reaction or complexing. Suitable acids are for example the strong mineral acids, e.g., HCl $H_2SO_4$, $H_3PO_4$, $HNO_3$, etc, formic, acetic, citric, oxalic, tartaric, succinic acids and the like.

Any aluminosilicate having sufficient acid stability to maintain at least a portion of its structured integrity or tetra-coordinated aluminum groups upon exposure to the conditions herein described can be treated by these procedures. Both of these qualities, i.e., structure and the presence of tetra-coordinated aluminum, are desirable properties. However, they do not necessarily coexist in all cases. For example, tetra-coordinated aluminum and the corresponding acidity and chemical activity to some extent can be present in an amorphous aluminosilicate. As shown in the examples hereinafter detailed, the described methods result not only in the production of a more physically stable zeolite, but also produce aluminosilicates having much more stable acid sites as well.

The presently preferred aluminosilicates are the crystalline species having $SiO_2/Al_2O_3$ ratios of at least about 2. This class includes both synthetic and naturally occurring zeolites. Illustrative of the synthetic zeolites are Zeolite X, U.S. Pat. Nos. 2,882,244, Zeolite Y, 3,130,007, Zeolite A, 2,882,243, Zeolite L, Belgium Pat. No. 575,117, Zeolite D, Canada Pat. No. 611,981, Zeolite R, U.S. Pat. Nos. 3,030,181, Zeolite S, 3,054,657, Zeolite T, 2,950,952, Zeolite Z, Canada Pat. Nos. 614, 995, Zeolite E, 636,931, Zeolite F, U.S. Pat. Nos. 2,995,358, Zeolite O, 3,140,252, Zeolite B, 3,008,803, Zeolite Q, 2,991,151, Zeolite M, 2,995,423, Zeolite H. 3,010,789, Zeolite J, 3,011,869, Zeolite W, 3,012,853, Zeolite KG, 3,056,654. Illustrative of the naturally occurring crystalline aluminosilicates which can be suitably treated by the methods herein described are levynite, dachiardite, erionite, faujasite, analcite, paulingite, noselite, ferrierite, haulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, and sodalite. However, the aluminosilicates which are presently most preferred due primarily to their chemical, physical and catalytic activity are the synthetic faujasites particularly zeolites X and Y the preparation and characteristics of which are described in U.S. Pat. Nos. 2,882,244 and 3,130,007 respectively.

Essentially any cationic form of these aluminosilicates can be employed without the necessity of pre-stabilization such as crystalline forms in which the structural aluminum atoms, e.g., $AlO_4$ tetrahedra, are associated with cations selected from ammonium and metal cations of Groups IA, IB and IIA, IIB, IIIB, VIIB and VIII. Due to simplicity of manufacture and the relative ease of ion exchange of the alkali metal and ammonium aluminosilicates, particularly the sodium and ammonium zeolites X and Y, those materials are particularly suitable for treatment in accordance with this invention.

Numerous noncrystalline substances can also be employed within the concept of this invention as previously discussed provided they contain an amount of tetra-coordinated aluminum atoms sufficient to at least significantly influence the properties of the total composition. In that the advantages of the methods herein described appear to be attributable primarily to the preservation of qualities associated with tetra-coordinated aluminum atoms, the benefits of these procedures are best realized when operating on starting materials containing a significant proportion of tetra-coordinated aluminum atoms. Exemplary of these materials are the natural and synthetic amorphous aluminosilicates, silica-alumina cogels, cogels of alumina with the oxides of the metals of Groups IIB, IIIB and IV of the Periodic Chart, such as alumina, zirconia, alumina magnesia, alumina beryllia and the like, in addition to naturally occurring aluminum containing clays, particularly the micaceous clays such as kaoline, montmorillonite, bentonite, illite, and the like.

I have also discovered that the effectiveness of these procedures for the removal of aluminum from aluminum containing refractory oxides at any given conditions of pH, time and temperature can be substantially improved by contacting the oxide with the acidic medium in the presence of a water soluble salt having a cation capable of exchanging with the cation exchange sites of the refractory oxide. Further advantage in this respect can be realized when the salt anion is capable of combining with aluminum by chemical reaction, complexing, or coordination.

The presence of the salt not only increases the degree of aluminum removal at otherwise identical conditions but also increases the resistance of the aluminosilicate to crystal structure collapse under the influence of the acidic medium. In other words, the presence of the salt in the aqueous acidic phase enable the use of more severe contacting conditions such as lower pH, higher temperatures or more prolonged contact time. As a result it is possible to increase the tolerance of the aluminosilicate to the contacting medium while at the same time improving the efficiency of aluminum removal. As previously discussed and as illustrated hereinafter in the specific examples, the presence of salts having the described characteristics provide further substantial advantages with regard to sorptive capacity, surface area and the acid forming ability of the refractory oxide. Refractory oxides possessing some tetra-coordinated aluminum, acid treated under the described conditions in the presence of the described salts retain substantially higher percentages of the original sorptive capacity and surface area than do the identical materials treated under identical conditions in the absence of dissolved salts. The residual acid-forming tendency of the refractory oxides treated in the presence of the described salts was also substantially higher than for those contacted under identical conditions in the absence of added salts. The expression "acid forming ability" is intended to prescribe the ability of the refractory oxides to form acidic sites upon activation, e.g., calcination, subsequent to the prescribed treatment Activation of this type is generally associated with dehydration of the refractory oxide in the area of the tetra-coordinated aluminum atoms. However, the acid forming tendency of these compositions depends on the ability to form acid sites upon calcination, although they may possess relatively little inherent acidity immediately following acid treatment.

Illustrative of the presently preferred salt anions are chloride, nitrate, sulfate, phosphate, acetate, citrate, oxalate, tartarate, and succinate anions. Illustrative of the presently preferred salt cations which are exchangeable with the cations present in the aluminosilicate are ammonium, primary, secondary and tertiary amines having up to 8 carbon atoms per molecule, and the metal cations of Groups IA, IB, IIA, IIB, and VIII of the Periodic Chart, particularly the alkali and alkaline earth metals.

Any of these salts, i.e., combinations of any of the anions and cations within the classes referred to, can be provided in the aqueous acidic contacting medium by either direct addition of the salt or by partial neutralization of the aqueous acid having the desired anion with a base having the desired cation. Although any salt concentrations result in some improvement whether the amount of salt present is only miniscule or if the solution is supersaturated, it is presently preferred that the salt concentration be at least about 30% of the acid concentration on the basis of chemical equivalents. COncentrations of at least about 5 weight-percent are usually employed although better results are obtained when the salt solution is highly concentrated, e.g., at least 50 percent saturated or even substantially completely saturated.

I have also observed that the increase in silica to alumina ratio resulting from treatment of an aluminosilicate at a given pH and temperature promotes a corresponding increase in acid tolerance so that further aluminum abstraction can be carried out under more severe conditions of pH and/or temperature without destroying the original crystal structure. This procedure is particularly advantageous when it is desirable to increase the silica to alumina ratio by the greatest possible extent while maintaining a substantial proportion of the original crystallinity. For example, following the treatment of a faujasite-type zeolite having a $SiO_2/Al_2O_3$ ratio of from about 2 to about 6 at a pH of from 2 to 5 and a temperature of from about 30° to about 220° F. for a period of from about 0.5 to about 30 hours, additional acid can be added to reduce the pH to a lower value within the range of from about 1 to about 4 after which contacting can be continued as desired. The extent of the described continued acid treatment should be for at least about 30 minutes and is preferably from about 1 to about 12 hours. Any of the aluminosilicates above referred to in any exchangeable cationic form can be advantageously treated by contacting with the described salt solutions.

The relatively amounts of aqueous medium and aluminum containing oxide employed in these contacting procedures can vary considerably since the primary variables involved in this regard are the reactant concentrations and the ease of physical contacting. As a result of these considerations it is presently preferred that sufficient aqueous medium be provided to form a relatively fluid slurry upon agitation so that relative homogeniety and adequate contacting can be effected. As a general rule at least about 2 volumes of acidic medium should be provided for each volume of refractory oxide.

The variation in $SiO_2/Al_2O_3$ ratio of the treated aluminum-containing oxides can be qualitatively evaluated by comparing the crystalline cell constant ($a_0$) as determined by X-ray diffraction for the original material to that of the finished product. This cell constant decreases as the proportion of silica increases, i.e., as the proportion of structural aluminum decreases, due to the smaller ionic radius of silica. This effect is discussed by D. W. Breck and E. M. Flanigen, Conference on Molecular Sieves, Soc. Chem., Ind., London, (1968) page 53. The data and evaluation presented by Breck et al indicate that the $SiO_2/Al_2O_3$ ratio is related to the cell constant ($a_0$) in the following manner: $SiO_2/Al_2O_3 = 3.333/(a_0-24.191) - 2.00$. This relationship is employed in the examples hereinafter detailed to obtain an evaluation of $SiO_2/Al_2O_3$ ratios based on cell constant determinations.

In each instance the cell constants were evaluated by determining the diffraction angles corresponding to crystal spacings defined by the following Miller indices: (660), (555), (840), and (664) using copper K-alpha radiation.

Aside from the influence of $SiO_2/Al_2O_3$ ratio the cell constant is also affected to a more limited extent by the degree of hydration and cationic form. For example, in the case of zeolitic aluminosilicates greater degrees of hydration result in expansion of the unit cell as does the presence of larger cations. Consequently, the X-ray determinations of cell constant for ammonium-Y sieve will indicate a larger unit cell size than will be indicated for the sodium form of the same Y zeolite due to the greater ionic radius of the ammonium cation. In order to eliminate the influence of these two parameters, i.e., degree of hydration and cationic form, on cell constant determination, these measurements were made only after the samples had been equilibrated to the water vapor pressure of a saturated solution of magnesium chloride. In each instance the X-ray spectra were obtained using calcite as an internal standard to precisely determine the goniometer angle for each sample. In addition to this precaution each zeolite was exhaustively back exchanged to the sodium form. Cell constants determined for zeolites otherwise prepared are thus indicated in the examples. Several of these determinations were made in the ammonium form and were corrected for the effect of the larger ammonium cation size by the relationship $a_0' = 1.0917 (a_0) - 2.314$ wherein $a_0'$ is the cell constant corrected to the sodium value and $a_0$ is the cell constant as determined from X-ray spectra directly when dealing with Y-zeolites having $SiO_2/Al_2O_3$ ratios of about 4 to about 5. The coefficients of this relationship were determined empirically by correlating cell constants directly from X-ray diffaction studies for several zeolites in the ammonium form, back exchanging those zeolites to the odium form and repeating the cell constant determination by X-ray.

In view of the many factors which can combine to introduce error into determinations of crystallinity, cell constant, composition, e.g., silica and alumina contents and the like from X-ray diffraction spectra, an alternative procedure was employed in several of the following examples to determine the final composition, particularly the alumina content of the treated refractory oxides. This procedure involved the wet chemical analysis of the aqueous phase recovered from the contacting step to determine the amount of aluminum abstracted from the refractory oxide. The procedure employed is similar to that discussed by E. F. Kaeble, "Handbook of X-Rays," McGraw-Hill Book Co., N.Y., Chap. 33. Analysis was made using Norelco X-ray equipment with a chromium target tube, pentaerythritol crystal, and aluminum K-alpha radiation. The sorptive capacity and surface areas obtained for the examples recovered from several of the following examples were determined by nitrogen adsorption in accordance with the procedures outlined in UTM 450–67 discussed by H. W. Daeschner and F. H. Stross, Anal. Chem. 34, (1962).

The acid forming ability of several of these refractory oxides is also reported in the examples. Briefly, this procedure involved exchanging the treated refractory oxide to the ammonium form and activating by calcination at 1,000° F. The activated oxides were then contacted with a benzene solution of calcone indicator to determine the presence or absence of acidity. These acidity tests served to indicate the presence or absence of acid activity. The principles and method of this test are described by H. A. Benesi, Journal of American Chem. Soc. 73, 5490 (1956). The information thus derived provides a further indication of the advantages that can be realized by effecting the described acid treatment in the presence of an excess of exchangeable cation.

The improved characteristics of aluminosilicates treated in accordance with this invention, particularly those relating to increased $SiO_2/Al_2O_3$ ratios, hydrothermal stability, exchange capacity and retention of active acid sites renders them particularly attractive for application in a number of processes. Exemplary of such processes are the use of the resultant aluminosilicates as ion exchange media or as catalyst or catalyst supports in the conversion of organic compounds, particularly hydrocarbons. Exemplary of hydrocarbon conversion systems in which these compositions are particularly suitable are hydrocracking, hydrofining, e.g., desulfurization and denitrogenation, isomerization, polymerization, hydrogenation, dehydrogenation and the like. Currently the most important catalytic applications of such compositions is in the conversion of hydrocarbons by hydrofining and hydrocracking in which case the described aluminosilicates should contain a catalytically active amount of hydrogenation component such as the Group VI or Group VIII metals, oxides and sulfides. Particularly useful compositions are those containing about 0.5 to about 10 weight-percent of Group VIII metal, oxide or sulfide and about 2 to about 25 weight-percent of at least one Group VI metal, oxide or sulfide, determined as the corresponding oxide particularly molybdenum and/or tungsten metals, oxides or sulfides.

It is also preferable when employing these luminosilicates as catalysts or catalyst supports to render them in the form of relatively stable aggregates, e.g., pellets, tablets, extradates and the like. The use of an added binder composition is usually preferred to improve the structural properties of the resultant aggregate. The binder compositions most commonly employed for aluminosilicates of this nature comprise predominantly alumina, certain forms of alumina being particularly preferred. For example, the acidified boehmite alumina described in copending application Ser. No. 713,993, now U.S. Pat. No. 3,557,024, incorporated herein by reference is particularly useful for this purpose.

The hydrocarbon conversion conditions usually employed in hydrofining, e.g., denitrogenation and desulfurization and hydrocracking include operating temperatures in excess of about 600° F. and hydrogen partial pressures in excess of at least about 50 psi, generally in excess of about 500 psi. The higher hydrogen partial pressures generally result in higher activity and increased conversion rates. The nature of hydrocarbon feeds suitable for application in such processes is generally well known in the art. Such hydrocarbon mixtures usually boil above about 400° F. and often constitute mixtures of hydrocarbons of widely variant boiling points within the range of about 400° to about 1,300° F. Contacting temperatures in excess of about 950° F. should generally be avoided in view of the relatively uncontrollable thermal cracking that results at such elevated temperatures and contemporaneous accelerated catalyst deactivation.

The following illustrative examples demonstrate the use of strong acids, weak acids, complexing acids, salts and the effect of various pH levels on the removal of structural aluminum from aluminum-containing refractory oxides. These examples are presented only as being illustrative of the concept of this invention and are not intended to be limiting thereof.

EXAMPLE 1

Forty grams of sodium zeolite Y on a dry weight basis were slurried in 500 ml of water after which 13.4 ml of 6N HCl were slowly added to adjust the pH to 3.3. The original sodium zeolite Y had a cell constant as determined by X-ray spectra of 24.644A., a $SiO_2/Al_2O_3$ ratio of 5.36 and a sodium content of 11.3 wt.% $Na_2O$. The original material was assigned a relative crystallinity of 100 percent for the sake of comparison between the characteristics of the zeolite before and after treatment by the procedures described in these examples.

The slurry formed by this procedure was maintained at 60° C. overnight (18 hours) after which the digested zeolite was collected by filtration, water washed and dried and the relative crystallinity of the zeolite thus prepared was determined by X-ray diffraction.

In order to eliminate the effect of a different cation size and degree of hydration on the cell constant determination, the zeolite prepared as above was exhaustively back exchanged with sodium and then equilibrated to an atmosphere of closely controlled water vapor pressure. This procedure involved the exhaustive ion exchange of a 5 gram portion (20 milliequivalents) of the zeolite product in 80 ml of solution containing 160 milliequivalents of sodium salt at 90° C. for 30 minutes. This exchanged zeolite was collected by centrifuging and decanting. This exchange procedure was repeated a second time at the same conditions. Thus the zeolite product was exchanged twice with an eight-fold excess of sodium ion. This sodium-exchanged product was water washed with chloride and dried prior to cell constant determination by X-ray. The resulting product had a relative crystallinity of 102 percent, cell constant of 24.620 A. and a $SiO_2/Al_2O_3$ ratio of 5.77. These results as well as those of the following examples are summarized in the table.

EXAMPLE 2

The identical procedures of Example 1 were repeated with the exception of that the hydrochloric acid was replaced by 48 ml of 6N acetic acid. This product, worked up and analyzed as described in Example 1, had a relative crystallinity of 41 percent, and cell constant of 24.625 A. The $SiO_2/Al_2O_3$ ratio had increased to 5.68.

EXAMPLE 3

The procedures of Example 1 were again repeated replacing the hydrochloric acid with 53.2 ml of 6N citric acid. The resultant product had a relative crystallinity of 31 percent, a cell constant of 24.585 A., and a greatly increased $SiO_2/Al_2O_3$ ratio of 6.46.

EXAMPLE 4

The original zeolite Y employed in Example 1 was contacted at the conditions described in that example with the exception that the zeolite was slurried in a 500 ml solution of 1.0M NaCl prior to the addition of sufficient 6N HCl to adjust the pH to 3.3. The resulting relative crystallinity was 121 percent, and the zeolite cell constant had decreased to 24.616 A. indicating an increase in the $SiO_2/Al_2O_3$ ratio to 5.84. The reason for the substantial increase in the relative crystallinity value has not been definitely determined, although it is reasonably attributable to the coalesence of the smaller crystals which diffract with less intensity than do larger crystals.

EXAMPLE 5

The original zeolite Y described in Example 1 was slurried in 500 ml of 0.33 M trisodium citrate. Sufficient 1.0 NaOH was added to adjust the original pH to a value of 10. The resulting slurry was aged, washed and worked up as described in Example 1.

The resulting product possessed a relative crystallinity of 11.5 percent, a cell constant of 24.645 A., and a $SiO_2/Al_2O_3$ ratio of 5.34 in close agreement with the untreated zeolite evidencing the lack of any affect of non-acidic media.

EXAMPLE 6

Forty grams of the zeolite described in Example 1 were slurried in 500 ml of water followed by the gradual addition of a citric acid (100 ml 6N) sodium hydroxide (8.0 ml 6N) mixture sufficient to adjust the pH to 3.5. The product was worked up and analyzed as described in Example 1 and the results are reported in the table. The dramatic effect of this treatment is apparent from the considerable increase in $SiO_2/Al_2O_3$ ratio to 7.08.

EXAMPLE 7

Example 6 was repeated with the exception that a greater amount of 6N NaOH (18.4 ml) was added with the citric acid to produce a final pH of 4.0. The $SiO_2/Al_2O_3$ ratio was shown to increase to 5.71 with a substantially greater retention of crystallinity.

EXAMPLE 8

Forty grams of the original zeolite Y sample were slurried 500 ml of 1.5 M NaCl followed by the gradual addition of a mixture of 100 ml 6N citric acid and 20.2 ml 6N NaOH to adjust the pH to 3.5. The resulting slurry was digested, worked up and analyzed as described in Example 1. Comparison of these results with Example 6 illustrates the improvement realized by thy use of higher salt concentrations. Zeolite stability was greatly improved.

EXAMPLE 9

Forty grams of ammonia zeolite Y having a residual sodium content of 1.8 wt.% $Na_2O$, a cell constant of 24.665 A., a $SiO_2/Al_2O_3$ ratio of 5.03 and a relative crystallinity of 107 were slurried in 500 ml of water at 60° C. Sufficient 6N acetic acid (177 ml) was added to adjust the pH to 3.3. The resulting slurry was aged at 60° C. overnight (18 hours) collected, and worked up and analyzed as described in Example 1.

EXAMPLE 10

Example 9 was repeated with the exception that the 40 grams of the ammonium zeolite Y were slurried in 500 ml of 1M ammonium acetate to which sufficient 6N acetic acid (875 ml) was added to adjust the pH to 3.7. The addition of salt resulted in a substantial increase in $SiO_2/Al_2O_3$ ratio to 5.49 and served to increase the tolerance of the zeolite to crystal distruction on exposure to acetic acid.

EXAMPLE 11

Example 9 was again repeated with the exception that the original ammonium zeolite Y was slurried in 500 ml of 1M ammonium citrate and the pH was adjusted to 10.0 by the addition of sufficient 6N $NH_4OH$ (67 ml). Here again, as in Example 5, no substantial variance in aluminosilicate structure resulted in the absence of acidic influence.

EXAMPLE 12

This example demonstrates the increase of $SiO_2/Al_2O_3$ ratio resulting from contacting aluminosilicates with nitric acid. The aluminosilicate employed in this example was sodium zeolite Y, (Linde SK–40 grade) having a sodium content of 12 weight-percent $Na_2O$, a cell constant ($a_0$) of 24.672 A., and a $SiO_2/Al_2O_3$ ratio of 4.93. The relative crystallinity of this material was compared to the sodium zeolite Y employed in Example 1 was 89 percent. As indicated by reduction in cell constant, the relative proportion of structural silica increased without significant change in crystallinity when this zeolite was contacted in the presence of nitric acid and ammonium nitrate at a pH of 2.8.

An aqueous slurry of this sodium zeolite was prepared by adding 56 grams of the zeolite to 550 ml water. The pH of the resulting slurry equilibrated at a value of 9.9. Sufficient 1.0 N $HNO_3$ (130 ml) was added to this slurry to adjust the pH to 2.8 at room temperature (25° C.) Followed by filtration of the zeolite from The aqueous phase within 15 minutes. The thus acidified zeolite was slurried in 750 ml of ammonium nitrate solution at a pH of 2.8 prepared by the addition of sufficient 1.0 N $HNO_3$ (0.83 ml per liter) to 1.0M ammonium nitrate. The pH of the resulting slurry was readjusted to 2.8 by the addition of sufficient 1.0 N $HNO_3$ (3.2 ml) and the slurry was contacted at 90° C. for 30 minutes. The resulting zeolite was filtered and contacted two additional times as described with 2.8 pH solutions of the ammonium nitrate-citric acid solution. In each instance the pH was adjusted to 2.8 with 1.0 N citric acid. After three sequential contacting periods the resulting zeolite was slurried in 500 ml of 1% $NH_3$, filtered and dried at 200° F. for 2 hours. This sample was worked up as described in Example 1 and had residual sodium content of 0.81 weight percent $Na_2O$, the relative crystallinity of 84 percent, a cell constant ($a_0$) of 24.664 A., and a greatly increased $SiO_2/Al_2O_3$ ratio of 5.92, calculated on the basis of the expression $a_0' = 1.0917\ a_0 - 2.314$ as described above to correct the cell constant observed for the ammonium form to the sodium form.

EXAMPLE 13

The improvement of silica to alumina ratio of aluminosilicates by treatment with ammonium acid citrate was accomplished as follows. The aluminosilicate employed in this example was ammonium zeolite-Y having a residual sodium content of 1.8 weight-percent $Na_2O$, a relative crystallinity compared to the sodium zeolite of Example 1 of 117, a cell constant (sodium form), $a_0$ of 24.663 A. and a silica to alumina ratio of 5.06. Fifty grams of the ammonium zeolite Y was added to 1 liter of contacting medium containing 0.020 mols citric acid and 0.550 mols of $NH_4H_2$ citrate at a pH of 3.0 after which the pH slowly began to rise due to the neutralizing effect of the ammonium zeolite. The pH was readjusted to 3.0 by the addition of sufficient 6.0N citric acid (99.3 ml) so that the resulting contacting medium contained a total of 0.219 mols of citric acid. This slurry was aged for 2 hours at 90° C. after which the product was collected by filtration, water washing and drying at 80° C. for 2 hours. In a manner similar to that described in Example 1 the product aluminosilicate was subject to multiple exchanges with sodium ion to convert it to the sodium form prior to cell constant determination. This exchange procedure consisted of slurrying the zeolite in 2N NaCl using 6 ml of the sodium chloride solution per gram of zeolite. The resulting salt slurries were aged at 80° C. for 20 minutes, centrifuged, decanted and resuspended in sodium chloride solutions for a total of four exchanges at the same conditions. The final exchange product was water washed and dried at 80° C. for 2 hours. The relative crystallinity of the resulting product was 26, cell constant of the sodium form was 24.584 A. and the structural silica/alumina ratio was 6.48 illustrating a very substantial increase in relative silica content as compared to the original zeolite which had a $SiO_2/Al_2O_3$ ratio of 5.06.

EXAMPLE 14

The prospect of increasing the $SiO_2/Al_2O_3$ ratio of aluminosilicates by employing the salts comprehended by the scope of this invention in non-acidic medium was investigated by contacting the ammonium zeolite-Y described in Example 13 with ammonium citrate in the absence of acid at a pH of 7.0. One liter of ammonium citrate solution at a pH of 7.0 was prepared by adding sufficient ammonium hydroxide to a citric acid solution to adjust the pH to 7.0. The final solution contained 0.50 mols $(NH_4)_3$ citrate and 0.07 mols $(NH_4)_2H$ citrate to which 50 grams of the ammonium zeolite-Y 14 described in Example 13 were added. The neutralizing effect of the ammonium zeolite was counteracted by the addition of sufficient 6N citric acid (1.60 ml) to maintain the pH to 7.0. The resulting slurry was aged for 2 hours at 90° C. and worked up as described in Example 13. The relative crystallinity of the final product was 98 percent, cell constant (sodium form) $a_0$ was 24.662 A., and the silica/alumina ratio was 5.08 corresponding almost exactly to the silica alumina ratio of the ammonium zeolite prior to contacting.

As a result of this and the foregoing examples it is apparent that the effects observed, i.e., the increase in $SiO_2/Al_2O_3$ ratio and the stabilizing effect provided by the presence of salts in acidic medium, are the results of the acid activity alone or the combined effect of the acid and salt. The improvements realized by contacting in the presence of added salt are particularly apparent by comparison of Example 8 to Example 6 wherein the stabilization of the aluminosilicate-acid medium with sodium chloride resulted in substantially higher crystallinity of the final product. Comparison of Example 10 to Example 9 illustrates that the presence of ammonium acetate actually accelerated the rate at which the silica to alumina ratio was increased.

cal analysis of the aqueous filtrate phase with aluminon reagent by the following procedure.

Only a slight degree of aluminum precipitation was observed in this example indicating the presence of only a slight amount of aluminum in the aqueous phase.

EXAMPLE 16

The procedure described in Example 15 was repeated with similar proportions of water and zeolite with the exception that the water phase comprised a saturated sodium chloride solution. A somewhat lesser amount of 6 N hydrochloric acid (12.5 ml) was required to provide an initial pH of 3.3 comparable to that employed in Example 15. Thus the aqueous phase of this example contained 75 meg. of hydrochloric acid as compared to approximately 80 meg. employed in Example 15. Nevertheless the hydrogen ion concentration in both instances was the same. This slurry was digested for 28 hours at 140° F. as described in Example 15 followed by filtration, washing and analysis. When treated with aluminon reagent, the filtrate of this example produced a very heavy precipitate indicating the presence of many times more aluminum than was observed in Example 15 in the absence of added salt. Comparison of these two examples, particularly with regard to the amount of aluminum abstracted from the

TABLE I

| | | | | | Product | | |
|---|---|---|---|---|---|---|---|
| Exp. | Cation form | Salt | Acid/ base | pH | Defracted X-ray intensity[a] | A. | $SiO_2/ Al_2O_3$ |
| Orig | Na | | | | 100 | 24.644 | 5.36 |
| 1 | Na | | HCl | 3.3 | 102 | 24.620 | 5.77 |
| 2 | Na | | HOAc | 3.3 | 41 | 24.625 | 5.68 |
| 3 | Na | | Citric | 3.3 | 31 | 24.585 | 6.46 |
| 4 | Na | NaCl | HCl | 3.3 | 121 | 24.616 | 5.84 |
| 5 | Na | Na citrate | NaOH | 10.0 | 115 | 24.645 | 5.34 |
| 6 | Na | do | Citric | 3.5 | 47 | 24.558 | 7.08 |
| 7 | Na | do | do | 4.0 | 87 | 24.623 | 5.71 |
| 8 | Na | NaCl/Na citrate | do | 3.5 | 100 | 24.629 | 5.61 |
| Orig | NH$_4$ | | | | 107 | 24.665 | 5.03 |
| 9 | NH$_4$ | | HOAc | 3.3 | 89 | 24.665 | 5.03 |
| 10 | NH$_4$ | NH$_4$OAc | HOAc | 3.7 | 114 | 24.636 | 5.49 |
| 11 | NH$_4$ | NH$_4$ citrate | NH$_4$OH | 10.0 | 105 | 24.667 | 5.00 |
| Orig | Na | | | | 89 | 24.672 | 4.93 |
| 12 | Na | NH$_4$NO$_3$ | HNO$_3$ | 2.8 | 84 | 24.612 | 5.92 |
| Orig | NH$_4$ | | | | 117 | 24.663 | 5.06 |
| 13 | NH$_4$ | NH$_4$H$_2$ citrate | Citric | 3.0 | 26 | 24.584 | 6.48 |
| 14 | NH$_4$ | (NH$_4$)$_3$ Citrate | | 7.0 | 98 | 24.662 | 5.08 |

[a] Normalized to the defracted intensity observed for the zeolite prior to treatment determined by X-ray defraction peak height.

Further insight into the nature and degree of the influence exhibited by the presence of salt and/or exchangeable cations and chelating anions is provided by wet chemical analysis of the aqueous phase in contact with the aluminum-containing refractory oxide and determination of the acidity exhibited by the treated aluminosilicates. The results of these investigations are discussed in the following examples.

EXAMPLE 15

A slurry of sodium zeolite Y (Linde SK-40 sieve) in hydrochloric acid was prepared by mixing 40 g of the sodium zeolite with 250 millimeters of water and adding sufficient 6 N hydrochloric acid (13.4 ml) to provide an initial pH of 3.3. The resultant slurry contained approximately 80 meg. of hydrochloric acid and about 150 meg. of sodium zeolite Y based on the exchange capacity of the original zeolite. This slurry was then digested for 28 hours at 140° F. after which the aluminosilicate was recovered by filtration, washed, and analyzed. The relative amount of aluminum extracted from the aluminosilicate was determined by wet chemialuminosilicate, provides a further indication that the hydrochloric acid preferentially attacks the zeolitic i.e., four-coordinated aluminum abstracting it from the matrix in the presence of an excess of exchangeable cation rather than promoting hydrogen exchange with the original zeolitic cation.

Further evidence of these characteristics is provided by evaluation of the ultimate acid stability of the thus treated aluminosilicates and evaluation of the zeolitic chemical properties subsequent to the described treatments. These parameters are investigated in the following examples.

EXAMPLES 17 THROUGH 21

Five zeolite slurries were prepared by mixing 5.15 g portions (20 meg.) of sodium zeolite Y (Linde SK-40 sieve) with five different volumes of water varying by increments from 55 to 80 millimeters. These slurries were then acidified by the gradual addition of 1.0 N HCl according to the schedules listed in Table 2 to produce slurries of different ultimate pH. The slurries were then aged for 16 hours at room temperature (75°

F.) subsequent to the last acid addition step. The resultant products were then collected by filtration, washed and analyzed by both X-ray and wet chemical techniques. In each instance, the final solution pH of the filtrate was determined by diluting the filtrate 10 to 1 with water to avoid ionization interference. The zeolite product crystallinities, cell constants and $SiO_2/Al_2O_3$ ratios were determined by X-ray diffraction spectra. Evaluation of $SiO_2/Al_2O_3$ ratios was also effected by X-ray fluorescence. In addition, an indication of zeolite chemical activity was derived by Hammett acidity measurements estimated from the intensity of the yellow indicator color developed by chalcone indicator in benzene solution. These evaluations were effected by the procedures described by H. A. Benesi, Journal of American Chem. Soc., 73, 5490 (1956). Evaluation of the physical and chemical stability of the resultant products upon exposure to severe hydrothermal environments were also effected by subjecting the calcined products to hydration and recalcination. All of these results are summarized in Tables 2 and 3.

EXAMPLES 22 THROUGH 26

This series of examples was run in parallel with Examples 17 through 21 discussed above with the exception that both the aqueous medium and the 1.0 N HCl were saturated with sodium chloride. As a consequence, each of the zeolite slurries of these examples was contacted with acid in the presence of concentrated sodium chloride solution as opposed to the salt free systems of Examples 17 through 21.

As previously mentioned, each of the filtrates from Examples 17 through 26 were evaluated to determine the final acidity after 10/1 dilution with distilled water. All of these pH's were in excess of 3.0 indicating that substantial hydrolysis of the zeolite structure had occurred. Since the sodium concentration in the 5.15 g of sodium zeolite Y employed in each of these examples amounted to only 20 meg. it is reasonable to conclude that a substantial part of this neutralization occurred by reaction of the acid with zeolitic aluminum in Examples 18 through 21 and 23 through 26 wherein the slurries contained 30 to 45 meg. of strong acid. The solvation of aluminum was also indicated by analysis of filtrates from the reaction mixtures and analysis of the final aluminosilicate products.

Both of these approaches evidenced that the presence of sodium chloride greatly increased the solvation of aluminum from the aluminosilicates as illustrated in Examples 15 and 16. In the examples summarized in Table 2 the filtrates from the aged slurries contained in excess of 30 percent more aluminum when sodium chloride was present than in the absence of sodium chloride. The X-ray diffraction spectra confirmed that the presence of an excess of exchangeable ions effectively stabilized the zeolite in the acid medium. In addition, the X-ray spectra and the X-ray fluoresence analysis confirmed that the salt containing mixtures produced a zeolite much richer in silica than was obtained in the absence of excess cation. The diffracted X-ray intensities also illustrated that the observed increased degree of aluminum removal was not effected at the expense of physical stability and crystallinity. On the contrary, the aluminosilicates treated in the presence of excess exchangeable cation were more highly crystalline even though a greater amount of alumina had been extracted from those structures.

TABLE 2.—THE EFFECT OF SALT ON ZEOLITE STABILIZATION AND ALUMINUM EXTRACTION

| Exp. | Acidified slurried,[f] 5.15 g. portions of Na-zeolite Y[b] | | | | | | | Aged filtrate | | X-ray analyses, zeolite product[e] | | | |
|---|---|---|---|---|---|---|---|---|---|---|---|---|---|
| | Initial[a] vol., ml. | Added NaCl | Vol. 1.0 N HCl, lapsed time[c] | | | | | $Al^{+3}$ conc., mg./ml. | pH[d] dil. 10/1 | Crystall., percent | Cell const. ao, A. | $SiO_2/Al_2O_3$ by ao | $SiO_2/Al_2O_3$ by fluorsc. |
| | | | Initial | 10 min. | 20 min. | 30 min. | Total | | | | | | |
| 17 | 80 | None | 5 ml. | 5 ml. | 5 ml. | 5 ml. | 20 ml. | 0.75 | 3.5 | 45 | 24.621 | 5.75 | 6.48 |
| 18 | 70 | None | 7.5 | 7.5 | 7.5 | 7.5 | 30 | 1.5 | 3.5 | 45 | 24.626 | 5.66 | 8.03 |
| 19 | 65 | None | 14.0 | 7.0 | 7.0 | 7.0 | 35 | 1.8 | 3.3 | 31 | 24.622 | 5.73 | 9.11 |
| 20 | 60 | None | 10.0 | 10.0 | 10.0 | 10.0 | 40 | 2.7 | 3.2 | 15 | | | 10.76 |
| 21 | 55 | None | 15.0 | 10.0 | 10.0 | 10.0 | 45 | 2.5 | 3.4 | 15 | | | |
| 22 | 80 | Sat | 5 ml. | 5 ml. | 5 ml. | 5 ml. | 20 | 1.5 | 3.5 | 77 | 24.636 | 5.49 | 7.13 |
| 23 | 70 | Sat | 7.5 | 7.5 | 7.5 | 7.5 | 30 | 2.1 | 3.5 | 54 | 24.612 | 5.92 | 8.32 |
| 24 | 65 | Sat | 14.0 | 7.0 | 7.0 | 7.0 | 35 | 2.6 | 3.5 | 40 | 24.618 | 5.81 | 9.87 |
| 25 | 60 | Sat | 10.0 | 10.0 | 10.0 | 10.0 | 40 | 3.6 | 3.5 | 32 | 24.618 | 5.81 | 10.36 |
| 26 | 55 | Sat | 15.0 | 10.0 | 10.0 | 10.0 | 45 | 3.5 | 3.5 | 28 | | | 12.30 |

[a] Zeolite plus distilled water.
[b] The starting material was Linde SK-40 sodium zeolite. The characteristics were as follows, 100% crystalline; 24,636 A. cell constant; and 5.36 $SiO_2/Al_2O_3$ ratio.
[c] The volumes of acid were added at the indicated lapsed time intervals, then the slurries were aged 16 hours at room temperature.
[d] Portions of the filtrates were diluted 1/10 before determining the pH's.
[e] The X-ray fluorescence analysis was based on the original zeolite as a reference standard. The silica/alumina ratio of the standard was 5.36 in the fluorescence measurements. Each product was washed on a filter with 1,000 ml. water prior to analysis.
[f] Final volume 100 ml. on each case.

The decreased ion adsorption errors.

The residual chemical activity of the extracted zeolites was evaluated by exchanging a portion of each of these zeolites to the ammonium form, calcination and testing with Hammett indicator (chalcone) to determine the residual acid strength. The effectiveness of this method of evaluation has been previously discussed by Benesi, Journal of American Chemical Society, 78, 5490 (1956) and others. The procedure was effected by exchanging each zeolite sample with a very large excess of ammonium chloride followed by conversion of the ammonium zeolite to the acid form by heating to 1,000° F. for 1 hour. The results of this investigation, summarized in Table 3, illustrate that the zeolites which were acid treated in the presence of excess cation retained strong acidity characteristics even after extensive alumina abstraction sufficient to increase the silica-to-alumina ratio to 10.36. In contrast, alumina abstraction in the absence of excess cation sufficient to increase the silica-to-alumina ratio to a level above 8.03 resulted in destruction of the acid character of the aluminosilicate.

The effect of these procedures is demonstrated even more emphatically by evaluation of the refractory oxides subsequent to hydration and recalcination at 1,000° F. The results of these investigations are also summarized in Table 3. This double calcination with intermediate rehydration served to test not only the physical stability of the crystalline aluminosilicate structure but also provided considerable insight into the tolerance and stability of the active acid sites. Three of the aluminosilicates extracted in the presence of excess cation, e.g., Examples 22, 23 and 24, retained strong acidic characteristics even after rehydration and calcination to 1,000° F. The chemical stability of these zeolites far surpassed that of even the most strongly acidic zeolite treated in the absence of excess cation, i.e., the aluminosilicate of Example 17, which evidenced only slight acidity after recalcination. It therefore appears that extraction of up to about 50 percent of the alumina originally present in an aluminosilicate can not only be more effectively achieved in the presence of excess exchangeable cation while retaining a substantial degree of structural integrity but that the exchange sites of the treated refractory oxide also benefit substantially by this procedure in that they resist degradation in the acid form.

TABLE 3

Extracted Zeolites Converted to the Acidic Form Acid Strength and Hydrothermal Stabilities The reported acidities were estimated from the intensity of the yellow color developed with chalcone indicator; $H_o = 6.6$ or 80% sulfuric acid.

| Example No. | Acidity by Indicator (a) Calcined (b) 1 hour, 1000°F | Wetted (c) Recalcined | $SiO_2/Al_2O_3$ mole ratio by analysis |
|---|---|---|---|
| (d) | Strong | Slight | 5.36 |
| 17 | Strong | Slight | 6.48 |
| 18 | Strong | None | 8.03 |
| 19 | Moderate | None | 9.11 |
| 20 | Slight | None | 10.76 |
| 21 | None | None | — |
| 22 | Strong | Strong | 7.13 |
| 23 | Strong | Strong | 8.32 |
| 24 | Strong | Strong | 9.87 |
| 25 | Strong | Slight | 10.36 |
| 26 | Slight | None | 12.30 |

(a) The zeolites were converted to the ammonium form before testing by exchanging four times with 3N $NH_4Cl$ using 18 equivalents per gram of zeolite per exchange.

(b) The ammonium zeolites were activated by gradually heating to 1000°F. in about one hour and holding 1000°F. for one hour.

(c) Portions of the calcined zeolites were immersed in water and recalcined as above.

(d) Untreated original aluminosilicates.

Two additional characteristics of relatively high surface are refractory oxides having some exchange capacity which render their use as selective adsorbents, catalysts, catalyst supports and the like attractive are sorptive capacity and of course the residual acidity of the refractory oxide generally attributable to activated four-coordinated aluminum atoms. This latter quality was demonstrated to some extent by the results of Examples 17 through 26, summarized in Table 3. The following examples further illustrate the ability of the procedures herein detailed to prevent, or at least minimize, the destruction of four-coordinated aluminum sites. These examples further illustrate the substantial advantage of the described procedures in preserving the sorptive capacity of refractory oxides.

EXAMPLES 27 THROUGH 36

Ten slurries of sodium zeolite Y in water were prepared by admixing 78 grams of the sodium zeolite, containing 49 weight-percent water, to 150 milliliters of distilled water. Eight of these slurries were treated with acid, either hydrochloric or acidic, in the amounts indicated in Table 4. Duplicates were run at each set of conditions. The only difference between the comparison slurries being that one of each set of comparisons was contacted with the prescribed amount of acid in the presence of excess sodium ion provided by the addition of 70 grams of sodium chloride. Two further comparison, Examples 27 and 28, were run in parallel with the remainder of the slurries, Examples 29 through 36, in the absence of acid. Each slurry was then aged for 2 hours at 160° F. The zeolite was then collected by filtration and was reslurried in a 25 weight-percent sodium chloride solution. Thus, post exchange with sodium was designed to fully exchange each of the products to the corresponding sodium form. The products were then thoroughly washed with distilled water and dried at 240° F. for 2 hours.

The dried products were then subjected to three analytical procedures. Firstly, the crystallinities of the several samples were determined on a relative basis by comparing the summed intensities of the five characteristic Miller indices evaluated by X-ray diffraction. The sorptive capacity of each sample was determined by measuring the quantity of nitrogen adsorbed at 0.02 atmospheres in a pure liquid nitrogen at 77° K. in accordance with the method of Daeschner and Stross, supra. The ability of the zeolites to retain their acid-forming structure and/or characteristics was also evaluated by exchanging the thus treated zeolites to the ammonium form, calcining at 1,000° F. and testing with chalcone indicator dissolved in benzene. These zeolites were converted to the ammonium form for this purpose by a double exchange with 20% $(NH_4)_2SO_4$ at 180° F. The results of these investigations are summarized in Table 4.

TABLE 4

THE EFFECT OF SALT ON THE ACID TREATMENT OF ZEOLITE Y

| Ex. No. | Reactants in Slurry(a) Salt added to Slurry | Acid added to Slurry(b) | Relative X-ray Intensity | Aged Product(c) Sorptive(d) Capacity $ccN_2/g$ | Acid Forming Aluminum |
|---|---|---|---|---|---|
| 27 | 70 g NaCltr | None | 80 | 180 | Strong |
| 28 | None | None | 73 | 175 | Strong |
| 29 | 70 g NaCl | 50ml. 6N HCl | 45 | 100 | Strong |
| 30 | None | 50ml. 6N HCl | 24 | 51 | Strong |
| 31 | 70 g NaCl | 90ml. 6N HCl | 26 | 50 | Strong |
| 32 | None | 90ml. 6N HCl | 11 | 43 | Negative |
| 33 | 70 g NaCl | 70ml. 6N HOAc | 85 | 163 | Strong |
| 34 | None | 70ml. 6N HOAc | 80 | 138 | Strong |
| 35 | 70 g NaCl | 90ml. 6N HOAc | 78 | 176 | Strong |
| 36 | None | 90ml. 6N HOAc | 76 | 117 | Strong |

(a) Slurries were prepared by mixing the indicated quantity of salt and 78 g. portions of Na-zeolite Y containing 49% water to 150 ml. water.
(b) The acid was added in 3 equal portions at 10 minute intervals.
(c) The acidified slurries aged 2 hours at 160°F. then the zeolite was collected by filtration; exchanged with 200 ml. 25% NaCl; washed with distilled water and dried.
(d) The sorptive capacity is the volume of nitrogen gas adsorbed at 0.02 atm. and liquid nitrogen temperature.

Comparison of Examples 27 and 28 illustrates that the presence of salt had little or no apparent effect on the composition crystallinity or adsorptive capacity of the sodium zeolite Y. In each case the presence of an excess of exchangeable cations substantially improved the tolerance of the zeolite to structural attack by hydrochloric acid as evidenced by comparison of Examples 29 through 32. Little or no effect in this regard was observed in the presence of acetic acid as illustrated by comparison of Examples 33 through 36. In every case the presence of excess exchangeable cation substantially improved the sorptive capacity of the resultant aluminosilicate. This result was observed both in the presence of hydrochloric acid and in the presence of acetic acid.

The effect of the excess ionizable salt concentration on the acid-forming quality of the treated aluminosilicate as illustrated by comparison of Examples 31 and 32 in which the starting material was subjected to the most severe acidic conditions. As illustrated by Example 31, the zeolite treated in the slurry containing 90 ml. of 6N hydrochloric acid and 70 grams of sodium chloride retained a sufficient amount of acid-forming character, i.e., was not modified by the acid to the extent that it would not be rendered acidic upon subsequent calcination, such that a positive indication with chalcone indicator was obtained. However, Example 32, conducted at otherwise identical conditions in the absence of salt, did not exhibit any acidic quality subsequent to calcination as indicated by the negative response of the chalcone indicator. Although Example 32 was the only test in which a negative response was obtained in this regard it is reasonable to conclude that a similar effect of varying degree was observed in the remaining examples. If the treated zeolites retained any acid-forming characteristic, i.e., exhibited any acidity subsequent to calcination, the chalcone indicator would provide a positive result without indicating a difference of degree between the amount of acidity exhibited by the respective zeolites. Consequently, if the severity of the acid treatment in each instance was not sufficient to completely destroy the acidity of the resulting product, a positive result with chalcone indicator would be achieved.

The results of these investigations, i.e., the observation that the tolerance of certain desirable aluminosilicate properties, e.g., retention of crystallinity and sorptive capacity, can be substantially increased in the presence of an excess of exchangeable cations suggest numerous varied utilities for the procedures herein described. For example, acid extraction in the presence of salts can be employed to improve the activity, selectivity and stability of zeolitic and non-zeolitic aluminosilicates. This technique is also particularly suitable for the preparation of catalytic combinations which require the use of acidic environments. Exemplary of such systems are the formation of silica gel by the polymerization of silicic acid and the formation of silica-alumina or silica-zirconia gel catalysts. The procedures herein described can be employed with advantage in the preparation of such gels in situ in the presence of acid sensitive aluminosilicates while minimizing deterioration of the desirable properties of the acid sensitive constituents. Similarly these procedures can be employed to stabilize acid sensitive aluminosilicates during impregnation procedures which require the use of acidic environments such as the impregnation of aluminosilicates with chromic and ferric salts or the heteropoly complexes of the Group IV elements.

In the preparation of the particularly preferred hydrocarbon conversion catalysts, from the aluminosilicates treated in accordance with the methods of this invention, a number of alternative approaches generally well known in the art can be utilized. Exemplary of these are ion exchange with an aqueous solution of a salt of the desired active metal, e.g., nickel nitrate, cobalt sulfate, etc., impregnation with an aqueous solution of a water soluble compound of the desired constituents such as chloroplatinic acid, ammonium heptamolybdate, tungstic acid, nickel nitrate, etc., or mechanical admixture, e.g., mulling with partially solublized or insoluble forms of the active metals, oxides or sulfides. However, before these procedures are undertaken it is generally desirable to replace most of the cations associated with the aluminosilicate, e.g., sodium, with one or more of ammonium, hydrogen or Group VIII non-noble metal cations, e.g., iron, cobalt or nickel. This objective is readily accomplished by ion exchange of the aluminosilicate with an aqueous solution of the water soluble salt of the corresponding cation, e.g., ammonium chloride, ammonium nitrate, nickel nitrate, iron sulfate, cobalt nitrate, etc. The ammonium form of the aluminosilicate can be calcined to convert it to the corresponding hydrogen form. In the alternative, the aluminosilicate can be converted to the corresponding hydrogen form by exchange with a mildly acidic aqueous solution of any one of a great variety of acids such as hydrochloric, nitric, sulfuric, acidic and the like, having a pH preferably less than about 4. Such ion exchange is preferably continued to the point that the sodium or other alkali metal ion content of the aluminosilicate is reduced to less than 2 weight-percent determined as the corresponding oxide.

The active metal containing form of the aluminosilicate recovered from ion exchange, mulling, etc., is calcined at a temperature of 700° to about 1,100° F. to convert the active metal salt to the corresponding oxide. Such calcination is preferably effected by gradually heating the aluminosilicate to the desired temperature, e.g., at a rate of less than about 600° F. per hour, and maintaining that temperature for at least about 10 minutes in the presence of an oxygen containing gas, e.g., air. Although the resultant calcined form of the aluminosilicate can be employed as an active catalyst without further modification, it is presently preferred that the active metal constituents be converted to the corresponding sulfides particularly when application of these compositions as hydrocracking and hydrofining catalysts is intended. This conversion can be readily effected by conventional sulfiding procedures generally well known in the art. In general these techniques involve contacting the aluminosilicate with a sulfur donor such as hydrogen sulfide, carbon bisulfide, elemental sulfur, and/or hydrocarbon thiols or thioethers containing up to about eight carbon atoms per molecule. The hydrogen sulfide or carbon bisulfide can be contacted with the aluminosilicate in the vapor form, either as a concentrated vapor system or as a dilute agent in the presence of a diluent such as hydrogen, nitrogen, etc. In the alternative, these materials may be dissolved in a suitable solvent such as relatively light hydrocarbons having from eight to 15 carbon atoms, e.g., kerosene, and the like.

Which ever alternative sulfiding procedure is chosen, the conditions of sulfiding should be such that substantial conversion of the metal oxides to the corresponding sulfides is effected. Contacting can be effected at ambient or elevated temperatures or pressures. Higher temperatures and pressures generally accelerate sulfiding. As a general rule, however, effective sulfiding can be effected by contacting at temperatures up to 700° F. (care being taken to avoid substantial cracking when hydrocarbon solvents are employed at the higher temperatures) and pressures up to 2,000 psig.

Although the degree and quality of sulfiding obtained can be more readily controlled when the catalyst is sulfided directly, before introduction to the conversion unit and introduction of the process steam, effective sulfiding can nevertheless be realized by sulfiding in situ by contacting with a sulfiding mixture or with the process stream with or without added sulfur. Procedures illustrative of the methods by which these aluminosilicates can be converted to hydrocarbon conversion catalysts are detailed in the following examples.

EXAMPLE 37

An active hydrocracking catalyst can be prepared by sequentially exchanging the aluminosilicate prepared in accordance with Example 29 with a 6N ammonium nitrate. This exchange is repeated three times employing 100 milliliters of ammonium nitrate solution for each 10 grams of aluminosilicate. The resultant ammonium form of the aluminosilicate is then separated from the exchange solution by filtration and contacted for 30 minutes with a 6N solution of nickel nitrate under mild agitation. One hundred milliliters of nickel nitrate solution are provided for each 10 grams of the ammonium zeolite. The aluminosilicate is then separated from the exchange solution and the exchange is repeated two additional times to incorporate about 2 weight-percent nickel in the aluminosilicate determined as the corresponding oxide.

The resultant aluminosilicate is then dried and mulled in a pan muller with nickel nitrate hexahydrate, ammonium heptamolybdate crystals and peptized boehmite alumina binder in amounts sufficient to provide a finished catalyst composition containing 20 wt.% alumina, 5 wt.% equivalent NiO and 18 wt.% $MoO_3$ on a dry weight basis. The alumina binder is first mulled with the aluminosilicate in the presence of 20 milliliters of water per 100 grams of aluminosilicate for about 15 minutes prior to addition of the ammonium heptamolybdate and nickel nitrate hexahydrate. About 3 milliliters of 6N nitric acid are added to the aluminosilicate-alumina admixture to partially peptize the alumina in situ. The nickel nitrate heptahydrate and ammonium molybdate are then added to the muller and mixing is continued for 20 additional minutes. The mixture is then extruded through a 1/16-inch dye, dried at 200° F. for 1 hour and calcined by heating at a rate of 400° F. per hour to 800° F. and maintaining the calcination temperature at 800° F. for an additional period of 1 hour. The resultant oxide form is then converted to the corresponding sulfide form by contacting with a stream of 10 percent hydrogen sulfide in hydrogen at 100° F. for 2 hours at ambient pressure.

Catalysts prepared in accordance with the procedures described in Example 7 are useful for hydrofining and hydrocracking hydrocarbon feeds, particularly mixtures boiling above about 400° F. or containing at least a substantial proportion of hydrocarbon constituents boiling above about 400° F. The products obtained can include midbarrel fuels, e.g., turbine and diesel fuels and furnace oils, and/or gasoline range hydrocarbons; the relative amounts of these products depending on the operating procedures and conditions employed. Even higher specific activity for the production of gasoline range hydrocarbons as opposed to midbarrel fuels can be provided by varying the composition of the catalyst as illustrated in the following example.

EXAMPLE 38

This example illustrates the manner in which a highly active hydrocracking catalyst particularly designed for the production of gasoline range hydrocarbons can be produced from the aluminosilicates treated in accordance with the concept of this invention. One hundred grams of the aluminosilicates treated in accordance with Example 31 are contacted with 1 liter of 6N ammonium nitrate under agitation for 15 minutes to effect a partial exchange of the sodium cations out of the aluminosilicate and replacement thereof with ammonium cations. The partially exchange aluminosilicate is separated from the supernatant exchange solution by filtration and sequentially contacted two additional times for corresponding periods of 15 minutes under agitation with similar exchange solution of 6N ammonium nitrate to effect further removal of sodium cation; the entire exchange procedure being designed to reduce the sodium content of the aluminosilicate to less than 2 weight-percent based on the corresponding equivalent weight of sodium oxide. The ammonium exchanged zeolite is then contacted with 1 liter of a solution prepared by dissolving 1.7 grams of palladium chloride in concentrated ammonia. The zeolite is contacted with the palladium solution under agitation for 20 minutes after which the zeolite crystals were separated from the supernatant aqueous phase by filtration and further purified by water washing. The resultant palladium containing aluminosilicate is dried for 2 hours at 200° F. and then calcined by heating at a rate of 400° F. per hour to a temperature of 800° F. and holding at 800° F. for an additional period of 1 hour. The catalyst is then sulfided by contacting with a stream of 10 percent hydrogen sulfide in hydrogen at 100° F. for 2 hours at atmospheric pressure.

EXAMPLE 39

Substantial amounts of midbarrel fuels, i.e., hydrocarbons boiling below 650°F., and gasoline range hydrocarbons boiling between 200° and 400°F. can be obtained by contacting a heavy gas oil having nominal boiling range between 650° and 1,000° F. containing 2 weight-percent sulfur and 500 ppm nitrogen with the catalyst prepared in accordance with Example 37 at a temperature of 720° F., a liquid hourly space velocity of 0.5 under a total pressure of 1,200 psig and in the presence of hydrogen supplied at a rate of 8,000 standard cubic feet per barrel of fresh feed on a once-through basis.

EXAMPLE 40

Substantial conversion of the heavy gas oil described in Example 39, hydrotreated to reduce the nitrogen and sulfur levels to 4 and 15 ppm respectively, to gasoline range hydrocarbons boiling from 200° to 400°

F., can be effected by contacting that feed with the catalyst of Example 38 at a temperature of 700° F., a liquid hourly space velocity of 0.5 under a total system pressure of 1,000 psig in the presence of hydrogen supplied at a rate of 8,000 standard cubic feet per barrel of fresh feed on a once-through basis.

I claim:

1. The method of treating a crystalline zeolitic aluminosilicate having silica-to-alumina ratios of at least about 2 and containing structural aluminum atoms associated with exchangeable cations including the steps of reacting said aluminosilicate with an aqueous acidic medium at a pH between about 2 and about 6 containing at least one water soluble salt of a cation exchangeable with said aluminosilicate at a temperature and for a period of time correlated with the acid stability of said crystalline zeolitic aluminosilicate sufficient to react said acid with at least a portion of said structural aluminum atoms yet insufficient to completely destroy the crystallinity of said aluminosilicate.

2. The composition prepared by treating an ion exchangeable zeolitic aluminosilicate having a silica-to-alumina ratio of at least about 2 and structural aluminum atoms associated with exchangeable cations with an aqueous acidic medium at a pH between about 2 and about 6 containing an ionizable water soluble salt of a cation exchangeable with said cations associated with said structural aluminum atoms at a temperature and for a period of time correlated with the acid stability of said zeolitic aluminosilicate sufficient to react said acid with said structural aluminum atoms yet insufficient to completely destroy the crystallinity of said aluminosilicate.

3. The method of claim 1 wherein said aqueous acidic medium contains at least one acid selected from the strong mineral acids, formic, acetic, citric, oxalic, malonic, succinic, tartaric and salicylic acids; nitriloacetic acids, and hydroxybenzene-sulfonic acids; the concentration of said salt in said aqueous medium corresponds to at least about 0.8 M, and said zeolitic aluminosilicate is contacted with said solution for a period of at least about 0.5 hours.

4. The method of claim 3 wherein the concentration of said salt in said aqueous medium corresponds to about 0.3 to about 6 M, said zeolitic aluminosilicate is contacted with said aqueous acidic medium at a temperature of about 30 to about 220° F. for a period of about 0.5 to about 30 hours, and the cation of said salt is selected from ammonium, primary, secondary and tertiary amines having up to about eight carbon atoms per molecule; and the metal cations of periodic Groups IA, IB, IIB, IIA, IIIB, VIIB and VIII.

5. The composition of claim 2 wherein said aqueous acidic medium contains at least one acid selected from the strong mineral acids, formic, acetic, citric, oxalic, malonic, succinic, tartaric and salicylic acids; nitriloacetic acids, and hydroxybenzene-sulfonic acids; the concentration of said salt in said aqueous medium corresponds to at least about 0.3 M, and said zeolitic aluminosilicate is contacted with said solution for a period of at least about 0.5 hours.

6. The composition of claim 2 wherein the concentration of said salt in said aqueous medium corresponds to about 0.3 to about 6 M, said zeolitic aluminosilicate is contacted with said aqueous acidic medium at a temperature of about 30 to about 220° F. for a period of about 0.5 to about 30 hours, and the cation of said salt is selected from ammonium; primary, secondary and tertiary amines having up to about eight carbon atoms per molecule; and the metal cations of periodic Groups IA, IB, IIB, IIA, IIIB, VIIB and VIII.

7. A catalytic composition comprising a refractory inorganic oxide and a catalytically active amount of the composition of claim 2 characterized by high hydrothermal structural stability and hydrothermally stable acid sites.

8. The method of claim 1 wherein said medium further comprises at least one salt having an anion selected from chloride, nitrate, phosphate, sulfate, acetate, citrate, oxalate, tartrate, formate, malonate, nitriloacetate, salicylate, hydroxybenzenesulfonate and succinate anions.

9. The method of claim 1 wherein said cation is selected from ammonium, primary, secondary and tertiary amines having up to eight carbon atoms per molecule and metal cations of Groups IA, IB, IIA, IIB and VIII of the Periodic Table.

10. The method of claim 8 wherein said aluminosilicate is selected from fantastic-type zeolites having the predominance of structural aluminum atoms associated with one of sodium and ammonium cations, the cation of said salt is selected from ammonium, primary, secondary and tertiary amines having up to eight carbon atoms, and metal cations of Groups IA, IB, IIA, IIB and VIII of the Periodic Chart, and the concentration of said salt is from about 0.3 to about 6 molar.

11. The method of claim 1 wherein said aluminosilicate is further treated in the presence of additional acid and a pH of from about 1 to about 4 and less than said first pH for an additional period of at least about 30 minutes.

12. The method which comprises contacting one of natural and synthetic crystalline zeolitic aluminosilicates having silica to alumina ratios of at least about 2 in an aqueous acidic medium at a pH of from about 2 to about 5, a temperature of from about 30° to about 220° F. for a period of from about 0.5 to about 30 hours, said pH, temperature and contact time being correlated with the acid stability of said aluminosilicate to abstract aluminum therefrom while substantially retaining the crystalline character of said aluminosilicate, wherein said aqueous acidic medium comprises at least about 5 weight-percent of a salt having a cation exchangeable with the cations of said aluminosilicate.

13. The method of claim 12 wherein the structural aluminum atoms of said aluminosilicate are associated with cations selected from hydrogen, ammonium, primary, secondary and tertiary amines having up to 8 carbon atoms, and the metal cations of Groups IA, IB, IIA, IIB, IIIB, VIIB and VIII of the Periodic Table, and the cation of said salt is selected from ammonium, primary, secondary and tertiary amines having up to eight carbon atoms, and the metal cations of Groups IA, IB, IIB, IIA, IIIB, VIIB and VIII of the Periodic Chart.

14. The method of claim 13 wherein the anion of said salt is selected from chloride, nitrate, sulfate, phosphate, acetate, citrate, oxalate, tartrate, formate, malonate, nitriloacetate, salicylate, hydrobenzene sulfonate, and succinate.

15. The method of claim 13 wherein said aluminosilicate is further contacted at a second pH within the range of from about 1 to about 4 lower than said first pH to further abstract additional aluminum from said aluminosilicate.

16. The method of treating an ion exchangeable aluminosilicate selected from natural and synthetic, crystalline and amorphous aluminosilicates containing tetra-coordinated aluminum atoms by contacting said aluminosilicate with an aqueous acidic medium at a pH within the range of about 2 to about 5 containing an excess of salt cations exchangeable with the cations associated with said tetra-coordinated aluminum atoms at a temperature of about 30° to about 200° F. for a contact time of at least about 0.5 hours, said temperature in contact time being correlated so as to prevent the complete destruction of the tetra-coordinated combination of said aluminum atoms.

17. The method of claim 16 wherein said aqueous acidic medium is at least about 50 percent saturated with a water soluble salt having cations exchangeable with the cations of said aluminosilicate and said aluminosilicate is contacted with said acidic aqueous medium at a temperature of about 30° to about 200° F. for a period of about 0.5 to about 30 hours.

18. The method of claim 16 wherein said aluminosilicate is contacted with said aqueous solution for a period of about 0.5 to about 30 hours, said aqueous solution is at least about 50 percent saturated with a water soluble salt having a cation selected from ammonium, primary, secondary and tertiary amines having up to about eight carbon atoms per molecule and the metal cations of Groups IA, IB, IIB, IIA, IIIB, VIIB and VIII of the Periodic Chart, said acidic aqueous medium contains at least one acid selected from strong mineral acids, formic, acetic, citric, oxalic, malonic, succinic, tartaric and salicylic acids, nitriloacetic acids and hydroxybenzene-sulfonic acids.

19. The method of claim 16 wherein said tetra-coordinated aluminum atoms of said aluminosilicate are associated with at least one cation selected from hydrogen, ammonium, primary, secondary and tertiary amines having up to about eight carbon atoms per molecule and the metal cations of Groups IA, IB, IIA, IIB, IIIB, VIIB and VIII of the Periodic Table and said aqueous acidic medium is at least 50 percent saturated with a water soluble salt having a cation selected from ammonium and the alkali and alkaline earth metals.

20. As a composition of matter an aluminosilicate having hydrothermally stable acid sites produced by the method of claim 16.

21. The aluminosilicate having highly stable acid sites produced by the method of claim 12.

22. A crystalline aluminosilicate characterized by high hydrothermal structural stability and having highly hydrothermally stable acid sites produced by the method of claim 16.

23. A highly hydrothermally stable crystalline aluminosilicate characterized by hydrothermally stable acid sites produced by the method of claim 18.

24. As a hydrocarbon conversion catalyst the composition of claim 20 containing at least one hydrogenation component selected from the Group VI and VIII metals, oxides and sulfides.

25. As a hydrocarbon conversion catalyst the composition of claim 22 containing at least one hydrogenation component selected from the Group VI and VIII metals, oxides and sulfides.

* * * * *

UNITED STATES PATENT OFFICE
CERTIFICATE OF CORRECTION

Patent No. 3,691,099  Dated September 12, 1972

Inventor(s) Dean Arthur Young

It is certified that error appears in the above-identified patent and that said Letters Patent are hereby corrected as shown below:

Column 25, line 41, "0.8 M" should read --0.3 M--.
Column 26, line 25, "fantastic-type" should read --faujasite-type--.

Signed and sealed this 30th day of January 1973.

(SEAL)
Attest:

EDWARD M. FLETCHER, JR.  ROBERT GOTTSCHALK
Attesting Officer  Commissioner of Patents